United States Patent [19]
Maeda et al.

[11] Patent Number: 5,908,794
[45] Date of Patent: Jun. 1, 1999

[54] GLASS COMPOSITION FOR A SUBSTRATE

[75] Inventors: Kei Maeda; Hitoshi Onoda; Yasumasa Nakao; Jeetendra Sehgal, all of Yokohama, Japan

[73] Assignee: Asahi Glass Company Ltd., Tokyo, Japan

[21] Appl. No.: 08/816,898

[22] Filed: Mar. 13, 1997

[30] Foreign Application Priority Data

Mar. 15, 1996 [JP] Japan .................................. 8-059648

[51] Int. Cl.$^6$ .................................................. C03C 3/087
[52] U.S. Cl. .................................. 501/70; 501/71; 501/72
[58] Field of Search .................................. 501/70, 72, 71

[56] References Cited

U.S. PATENT DOCUMENTS

| 5,108,960 | 4/1992 | Boek et al. |
| 5,296,294 | 3/1994 | Suzuki et al. ........................ 501/70 |
| 5,599,754 | 2/1997 | Maeda et al. |
| 5,631,195 | 5/1997 | Yanagia et al. ...................... 501/72 |
| 5,721,181 | 2/1998 | Sehgal et al. ........................ 501/72 |

FOREIGN PATENT DOCUMENTS

| 3-40933 | 2/1991 | Japan . |
| 7-257937 | 10/1995 | Japan . |
| 8-290938 | 11/1996 | Japan . |
| 8-290939 | 11/1996 | Japan . |
| WO 96/11887 | 4/1996 | WIPO . |

OTHER PUBLICATIONS

Derwent WPI Abstract of SU 416321, Aug. 1974.
Derwent WPI Abstract of SU 948919, Aug. 1982.
Derwent WPI Abstract of GB 1261873, Apr. 1972.

*Primary Examiner*—Karl Group
*Attorney, Agent, or Firm*—Oblon, Spivak, McClelland, Maier & Neustadt, P.C.

[57] ABSTRACT

A glass composition for a substrate consisting essentially of from 56 to 72 wt % of $SiO_2$, from 1 to less than 14 wt % of $Al_2O_3$, from 0 to 9 wt % of MgO, from 0.5 to 11 wt % of CaO, from 0 to 4 wt % of SrO, from 0 to 3 wt % of BaO, from 6 to less than 14 wt % of MgO+CaO+SrO+BaO, from 0 to 9 wt % of $Na_2O$, from 6 to 20 wt % of $K_2O$, and from 6 to 20 wt % of $Na_2O+K_2O$.

5 Claims, No Drawings

GLASS COMPOSITION FOR A SUBSTRATE

BACKGROUND OF THE INVENTION

Field of The Invention

The present invention relates to a glass composition for a substrate which is useful for a flat display panel, particularly for a plasma display panel (PDP).

Discussion of Background

PDP is prepared usually by baking metal electrodes, an insulating paste, a rib paste, etc. on a substrate glass at a maximum temperature of from about 550 to 600° C., followed by frit-sealing a facing plate. As a substrate glass for this purpose, it has heretofore been common to employ soda lime silicate glass which is widely used in the field of buildings or automobiles.

However, the glass transition temperature of such soda lime silicate glass is at a level of from 530 to 560° C. Therefore, if subjected to heat treatment at the above maximum temperature, the substrate glass undergoes deformation or shrinkage, and thus undergoes a substantial dimensional change, whereby it has been difficult to precisely align the electrode positions with the facing plate. Especially when a continuous baking furnace such as a belt furnace having a high productivity is used for the production of PDP, there has been a problem that a temperature difference will result between the front end and the rear end of the glass plate during baking, and the glass plate will undergo an asymmetrical dimensional change between the forward and rear ends.

To solve such a heat deformation or heat shrinkage problem of a glass substrate, a glass which has a thermal expansion coefficient close to soda lime silicate glass and which has a high glass transition temperature and a high strain point, has been proposed (JP-A-3-40933, JP-A-7-257937). If such a glass is employed, even when a continuous baking furnace is used for heat treatment for the production of PDP, the panel can be baked at high precision, since it scarcely undergoes an asymmetrical dimensional change between the front and rear ends as will be problematic with soda lime silicate glass.

However, due to a trend for large size PDP in recent years, handling of the substrate during the production process tends to be increasingly difficult. Especially, a large size substrate receives a larger bending stress by its own weight in many cases, whereby presence of a slight scar is likely to bring about breakage during the production process.

Further, the compositions which have been proposed, have an additional problem that they have large specific gravities exceeding 2.6, whereby it is difficult to accomplish weight reduction of materials.

SUMMARY OF THE INVENTION

It is an object of the present invention to solve the above problems and to provide a glass composition for a substrate, which has a high glass transition temperature and an average thermal expansion coefficient within a range of from 50 to 350° C. being equivalent to soda lime silicate glass and which is scratch resistant and scarcely breakable during the production process.

The present invention provides a glass composition for a substrate consisting essentially of from 56 to 72 wt % of $SiO_2$, from 1 to less than 14 wt % of $Al_2O_3$, from 0 to 9 wt % of MgO, from 0.5 to 11 wt % of CaO, from 0 to 4 wt % of SrO, from 0 to 3 wt % of BaO, from 6 to less than 14 wt % of MgO+CaO+SrO+BaO, from 0 to 9 wt % of $Na_2O$, from 6 to 20 wt % of $K_2O$, and from 6 to 20 wt % of $Na_2O+K_2O$.

DETAILED DESCRIPTION OF THE PREFERRED EMBODIMENTS

Now, the reason for the definition of the composition of the glass of the present invention will be described.

$SiO_2$ is a component constituting the network of the glass. If its content is less than 56 wt %, the heat resistance of the glass tends to be poor, and the glass tends to be scratchable. It is preferably at least 60 wt %. On the other hand, if it exceeds 72 wt %, the thermal expansion coefficient tends to be too small. It is preferably at most 70 wt %.

$Al_2O_3$ is incorporated in an amount of at least 1 wt % to increase the glass transition temperature and improve the heat resistance. From this viewpoint, its content is preferably at least 2 wt %. On the other hand, if its content exceeds 14 wt %, the meltability of the glass tends to be poor. Its content is preferably at most 10 wt %, more preferably at most 8 wt %.

MgO is not essential but may be incorporated to lower the viscosity during melting of the glass and facilitate the melting. To ensure the effect, its content is preferably at least 1 wt %, particularly at least 3 wt %. On the other hand, if its content exceeds 9 wt %, the thermal expansion coefficient tends to be too large, the devitrification temperature tends to be high, and the glass tends to be scratchable. From this viewpoint, its content is preferably at most 6 wt %.

CaO is incorporated in an amount of at least 0.5 wt % to reduce the viscosity during melting and facilitate the melting. Its content is preferably at least 2 wt %, particularly at least 3 wt %. On the other hand, if its content exceeds 11 wt %, the thermal expansion coefficient tends to be too large, and the devitrification temperature tends to be high, and the glass tends to be scratchable. Preferably, its content is at most 9 wt %, particularly preferably at most 8 wt %.

SrO is not an essential component, but may be incorporated as it is effective to lower the viscosity during melting of the glass and thus facilitate the melting. However, if its content exceeds 4 wt %, the glass tends to be scratchable. Preferably, its content is at most 2 wt %, more preferably at most 1 wt %.

BaO is not an essential component, but may be added as it is effective to lower the viscosity during melting of the glass and thus facilitate the melting. However, if its content exceeds 3 wt %, the glass tends to be scratchable. Preferably, its content is at most 2 wt %, particularly preferably at most 1 wt %.

The content of MgO, CaO, SrO and BaO is at least 6 wt %, preferably at least 8 wt %, in their total amount to lower the viscosity during melting of the glass and thereby facilitate the melting. On the other hand, if the total amount exceeds 14 wt %, the glass tends to be scratchable, and the devitrification temperature tends to be high. Preferably, the total amount is at most 13 wt %.

$Na_2O$ is not essential, but may be incorporated, since it is effective to lower the viscosity during melting of the glass and thereby facilitate the melting. To ensure the effects, its content is preferably at least 1 wt %. On the other hand, if its content exceeds 9 wt %, the thermal expansion coefficient tends to be too large, and the chemical durability tends to be low, and the electrical resistance tends to be small. Preferably, its content is at most 6 wt %, more preferably at most 4 wt %, most preferably at most 3 wt %.

K$_2$O has the same effects as Na$_2$O, and it is incorporated in an amount of at least 6 wt %, preferably at least 10 wt %, more preferably at least 12 wt %. On the other hand, if its content exceeds 20 wt %, the thermal expansion coefficient tends to be too large, and the chemical durability tends to be low. Preferably, its content is at most 18 wt %, particularly preferably at most 16 wt %.

Na$_2$O and K$_2$O are incorporated in their total amount of at least 6 wt %, preferably at least 10 wt %, more preferably at least 12 wt % to lower the viscosity during melting of the glass and facilitate the melting. On the other hand, if the total amount exceeds 20 wt %, the chemical durability tends to be low, and the electrical resistance tends to be small. Preferably, the total amount is at most 18 wt %, particularly preferably at most 16 wt %.

In addition to the above components, the glass of the present invention may contain As$_2$O$_3$, Sb$_2$O$_3$, P$_2$O$_5$, F and Cl in a total amount of at most 2 wt % to improve the meltability, the clarity and the forming property of the glass. To facilitate recycling of glass, the content of As$_2$O$_3$ or Sb$_2$O$_3$ should preferably be no more than 0.5 wt %, more preferably no more than an impurity level. Likewise, to maintain the strain point at a high level, the content of P$_2$O$_5$, F or Cl should preferably be no more than 0.5 wt %, more preferably no more than an impurity level. Further, in order to improve the chemical durability of the glass, La$_2$O$_3$, TiO$_2$ and SnO$_2$ may be incorporated in a total amount of at most 5 wt %. Further, coloring agents such as Fe$_2$O$_3$, CoO, NiO, Se and Nd$_2$O$_3$ may be incorporated to adjust the color of the glass. The content of such coloring agents is preferably at most 1 wt % in their total amount.

Further, in order to increase the glass transition temperature, ZrO$_2$ may be incorporated in a very small amount. However, the content of ZrO$_2$ is less than 0.5 wt %, since the glass tends to be scratchable by its incorporation. Preferably, it should not be substantially contained beyond an impurity level.

Further, in order to improve the meltability, B$_2$O$_3$ may be incorporated. However, its excessive incorporation decreases the thermal expansion coefficient. Accordingly, its content is preferably less than 1.5 wt %. More preferably, it is better not to substantially incorporate it.

ZnO may be incorporated in order to improve the meltability. However, if it is incorporated in an amount of 5 wt % or more, it is likely to be reduced in the float bath and thus is likely to bring about a drawback.

Further, Li$_2$O may be incorporated in order to improve the meltability. However, if it is incorporated in an amount of 3 wt % or more, the glass transition temperature tends to be low.

The glass transition temperature of the glass of the present invention thus obtained, is preferably at least 600° C., more preferably at least 625° C. The average thermal expansion coefficient of the glass of the present invention within a range of from 50 to 350° C. is preferably within a range of from $75 \times 10^{-7}$ to $90 \times 10^{-7}$/° C., more preferably within a range of from $80 \times 10^{-7}$ to $90 \times 10^{-7}$/° C.

The glass of the present invention preferably has a brittleness index of at most 7400 m$^{-1/2}$, more preferably at most 7300 m$^{-1/2}$.

In the present invention, as the brittleness index of glass, brittleness index B proposed by Lawn et al. is used (B. R. Lawn and D. B. Marshall, J. Am. Ceram. Soc., 62 [7–8] 347–350(1979)). Here, brittleness index B is defined by the formula (1) using the Vickers hardness H$_v$ and the fracture toughness K$_c$ of the material.

$$B = H_v / K_c \quad (1)$$

Further, the glass of the present invention preferably has a specific gravity of less than 2.6, more preferably at most 2.55, most preferably at most 2.5.

The glass of the present invention is suitable for use as a substrate for PDP. Its spectral transmittance is preferably at least 85% within the ranges of from 425 to 475 nm, from 510 to 560 nm and from 600 to 650 nm, respectively, since light generation within these wavelength ranges can effectively be used for display.

The glass substrate of the present invention can be prepared, for example, by the following method. Namely, raw materials of the respective components which are commonly used, are blended to obtain a desired composition, which is continuously introduced into a melting furnace, and heated and melted at a temperature of from 1500 to 1600° C. This molten glass is formed into a sheet having a predetermined thickness by a float process, and the sheet is annealed and then cut to obtain a transparent glass substrate.

Now, the present invention will be described in further detail with reference to Examples. However, it should be understood that the present invention is by no means restricted by such specific Examples.

EXAMPLES 1 to 12 and COMPARATIVE EXAMPLES 13 to 18.

Test Examples relating to the present invention are shown in Tables 1 to 3.

Raw materials for the respective components were mixed to have the desired composition and heated and melted at a temperature of from 1550 to 1650°C. for from 4 to 5 hours by means of a platinum crucible. During the melting, a platinum stirrer was used for stirring for two hours to homogenize the glass.

With respect to the glass thus obtained, the brittleness index B, the thermal expansion coefficient a, the glass transition temperature T$_g$ and the specific gravity were measured and shown in Tables 1 to 3 together with the glass compositions. Example Nos. 1 to 12 represent working Examples of the present invention, and Example Nos. 13 to 18 represent Comparative Examples.

In these test Examples, the physical properties were measured as follows:

Brittleness index B (unit: m$^{-1/2}$):

A problem when the brittleness index is applied to glass, is that it is difficult to accurately evaluate the fracture toughness K$_c$. However, the present applicants have studied several methods and as a result, have found that the brittleness can quantitatively evaluated from the relation between the size of the mark of an indenter left on the glass surface when the Vickers indenter was pressed against the glass surface and the length of cracks formed from the four corners of the mark. This relation can be defined by the following formula (2). Here, P is the pressing load of the Vickers indenter, and a and c are the diagonal length of the Vickers indentation mark and the length of cracks formed from the four corners of the mark (the total length of symmetrical two cracks containing the mark of the indenter).

$$c/a = 0.0056 B^{2/3} P^{1/6} \quad (2)$$

Using the formula (2) and the sizes of Vickers indentation marks formed on various glass surfaces, the brittleness index was evaluated.

Thermal expansion coefficient α (unit: $\times 10^{-7}$/° C.):

By means of a differential thermal expansion meter and using a quartz glass as a reference sample, elongation of a glass was measured when it was heated from room temperature at a rate of 5° C./min. The measurement was continued to a temperature (yield point) at which elongation was no longer observed even when the glass was softened, and the average linear thermal expansion coefficient within a range of from 50 to 350° C. was calculated.

Glass transition temperature $T_g$ (unit: ° C.):

The bending point in the thermal expansion curve was taken as the glass transition temperature.

Specific gravity:

Using a glass block of about 20 g containing no bubble, the specific gravity was measured by an Archimedes method.

As is evident from the Tables, the brittleness indices of the glass compositions of the present invention are not higher than 7400 $m^{-1/2}$, thus indicating that the glasses are scarcely scratchable. The thermal expansion coefficients are within a range of from $80 \times 10^{-7}$ to $90 \times 10^{-7}$/° C., which is equivalent to the thermal expansion coefficient of soda lime glass which has been used as a substrate for PDP, and therefore the same type of frit material can be used. Further, the glass transition temperatures are all at least 600° C., thus indicating that there is no such problem that the glasses undergo deformation or shrinkage during the preparation of large size PDP. The specific gravity is less than 2.6, which facilitates weight reduction of the materials.

On the other hand, Example 13 has a glass transition temperature $T_g$ of 550° C., whereby thermal deformation of the glass during the preparation of PDP will be problematic. In Examples 14 to 18, the brittleness indices exceed 7400 $m^{-1/2}$, thus indicating that the glasses are susceptible to scratching, and the probability of breakage during the production process is high. Further, the compositions of Examples 14 to 18 have specific gravities of at least 2.6, whereby it is difficult to reduce the weight of the materials.

TABLE 1

|  | 1 | 2 | 3 | 4 | 5 | 6 |
|---|---|---|---|---|---|---|
| $SiO_2$ | 66.7 | 63.4 | 69.6 | 67.5 | 66.5 | 65.2 |
| $Al_2O_3$ | 4.9 | 7.9 | 3.2 | 7.9 | 6.4 | 7.2 |
| MgO | 4.8 | 3.8 | 3.8 | 3.1 | 4.5 | 4.4 |
| CaO | 7.1 | 7.8 | 6.2 | 5.2 | 6.6 | 6.2 |
| SrO | 0.0 | 0.8 | 0.0 | 0.0 | 0.0 | 0.0 |
| BaO | 0.0 | 1.2 | 0.0 | 0.0 | 1.2 | 0.0 |
| $Na_2O$ | 1.5 | 1.9 | 1.5 | 2.4 | 2.9 | 2.9 |
| $K_2O$ | 15.0 | 13.2 | 15.7 | 13.9 | 11.9 | 14.1 |
| MgO + CaO + SrO + BaO | 11.9 | 13.6 | 10.0 | 8.3 | 12.3 | 10.6 |
| B ($m^{-1/2}$) | 6500 | 7100 | 6500 | 6400 | 6800 | 6800 |
| $T_g$ (° C.) | 641 | 661 | 635 | 655 | 636 | 616 |
| $\alpha$ (× $10^{-7}$/° C.) | 83 | 81 | 81 | 80 | 81 | 89 |
| Specific gravity | 2.46 | 2.50 | 2.44 | 2.44 | 2.48 | 2.47 |

TABLE 2

|  | 7 | 8 | 9 | 10 | 11 | 12 |
|---|---|---|---|---|---|---|
| $SiO_2$ | 62.8 | 69.3 | 67.8 | 66.2 | 66.2 | 68.3 |
| $Al_2O_3$ | 9.5 | 2.0 | 8.0 | 6.3 | 5.5 | 7.2 |
| MgO | 4.7 | 5.2 | 5.0 | 3.8 | 1.9 | 5.1 |
| CaO | 6.6 | 6.3 | 2.6 | 6.1 | 8.7 | 3.5 |
| SrO | 0.0 | 0.0 | 0.0 | 0.0 | 0.0 | 0.0 |
| BaO | 0.0 | 1.2 | 0.0 | 0.0 | 2.4 | 0.0 |
| $Na_2O$ | 2.4 | 1.0 | 1.9 | 0.0 | 2.9 | 2.5 |
| $K_2O$ | 14.0 | 15.0 | 14.7 | 17.6 | 12.4 | 13.4 |
| MgO + CaO + SrO + BaO | 11.3 | 12.7 | 7.6 | 9.9 | 13.0 | 8.6 |
| B ($m^{-1/2}$) | 6600 | 6500 | 6500 | 6800 | 7200 | 6500 |
| $T_g$ (° C.) | 641 | 629 | 634 | 667 | 645 | 636 |
| $\alpha$ (× $10^{-7}$/° C.) | 89 | 81 | 85 | 83 | 80 | 82 |
| Specific gravity | 2.48 | 2.46 | 2.42 | 2.44 | 2.51 | 2.43 |

TABLE 3

|  | 13 | 14 | 15 | 16 | 17 | 18 |
|---|---|---|---|---|---|---|
| $SiO_2$ | 72.5 | 58.0 | 57.4 | 57.4 | 58.6 | 58.0 |
| $Al_2O_3$ | 1.0 | 10.0 | 12.1 | 12.1 | 14.2 | 12.5 |
| MgO | 2.5 | 4.0 | 3.0 | 3.0 | 2.0 | 2.0 |
| CaO | 9.5 | 9.0 | 5.9 | 7.9 | 5.1 | 5.0 |
| SrO | 0.0 | 3.8 | 1.0 | 1.0 | 2.0 | 2.0 |
| BaO | 0.0 | 3.0 | 4.0 | 4.0 | 3.0 | 6.0 |
| ZnO | 0.0 | 0.0 | 2.0 | 0.0 | 0.0 | 0.0 |
| $Na_2O$ | 14.0 | 4.0 | 4.2 | 4.2 | 6.0 | 4.0 |
| $K_2O$ | 0.5 | 6.0 | 8.2 | 8.2 | 6.1 | 8.0 |
| $ZrO_2$ | 0.0 | 2.0 | 2.2 | 2.2 | 3.0 | 2.5 |
| $SO_3$ | 0.0 | 0.2 | 0.0 | 0.0 | 0.0 | 0.0 |
| MgO + CaO + SrO + BaO | 12.0 | 19.8 | 13.9 | 15.9 | 12.1 | 15.0 |

TABLE 3-continued

|  | 13 | 14 | 15 | 16 | 17 | 18 |
|---|---|---|---|---|---|---|
| B (m$^{-\frac{1}{2}}$) | 7100 | 7600 | 7600 | 7500 | 7500 | 7600 |
| T$_g$ (° C.) | 550 | 645 | 655 | 646 | 654 | 652 |
| α (× 10$^{-7}$/° C.) | 87 | 79 | 81 | 84 | 81 | 81 |
| Specific gravity | 2.49 | 2.65 | 2.63 | 2.62 | 2.60 | 2.63 |

As described in the foregoing, the glass of the present invention is scarcely scratchable and has high heat resistance and a thermal expansion coefficient equivalent to soda lime silicate glass, and thus it is useful for an application where such properties are required, for example, as a substrate for PDP. Further, it has a small specific gravity, which facilitates weight reduction of the materials.

What is claimed is:

1. A glass composition for a substrate consisting essentially of from 56 to 72 wt % of $SiO_2$, from 1 to less than 14 wt % of $Al_2O_3$, from 0 to 9 wt % of MgO, from 0.5 to 11 wt % of CaO, from 0 to 4 wt % of SrO, from 0 to 3 wt % of BaO, from 6 to less than 14 wt % of MgO+CaO+SrO+BaO, from 0 to 9 wt % of $Na_2O$, from 6 to 20 wt % of $K_2O$, from 6 to 20 wt % of $Na_2O+K_2O$ and from 0 to less than 1 wt % of a coloring agent selected from the group consisting of $Fe_2O_3$, CoO, NiO, Se and $Nd_2O_3$.

2. The glass composition for a substrate according to claim 1, wherein the brittleness index is at most 7400 m$^{-\frac{1}{2}}$.

3. The glass composition for a substrate according to claim 1, which has a specific gravity of less than 2.6.

4. The glass composition for a substrate according to claim 1, wherein the glass transition temperature is at least 600° C., and the average thermal expansion coefficient within a temperature range of from 50 to 350° C. is from 75×10$^{-7}$ to 90×10$^{-7}$/° C.

5. A plasma display panel having a glass substrate which is made of the glass composition for a substrate as defined in claim 1.

* * * * *